United States Patent [19]
Hayashi et al.

[11] Patent Number: 5,914,385
[45] Date of Patent: Jun. 22, 1999

[54] POLYIMIDE RESIN COMPOSITION AND METHOD FOR PRODUCING PREPREG AND PAINT AND METHOD FOR CURING RESIN USING THE SAME

[75] Inventors: Noriya Hayashi; Naomoto Ishikawa; Yukihiro Sakaguchi; Shunichi Hayashi; Hitoshi Noda, all of Aichi-ken, Japan

[73] Assignee: Mitsubishi Jukogyo Kabushiki Kaisha, Tokyo, Japan

[21] Appl. No.: 08/760,583

[22] Filed: Dec. 4, 1996

[30] Foreign Application Priority Data

Oct. 3, 1996 [JP] Japan .................................. 8-262838

[51] Int. Cl.⁶ .................................................. C08G 73/10
[52] U.S. Cl. ......................... 528/170; 528/125; 528/128; 528/172; 528/173; 528/179; 528/185; 528/188; 528/220; 528/229; 528/350; 528/353; 524/600; 524/606; 428/473.5
[58] Field of Search ..................................... 528/353, 220, 528/229, 172, 173, 179, 185, 188, 350, 125, 128, 170; 524/600, 606; 428/473.5

[56] References Cited

U.S. PATENT DOCUMENTS

| | | | |
|---|---|---|---|
| 3,528,950 | 9/1970 | Lubowitz | 528/353 |
| 3,708,459 | 1/1973 | Lubowitz | 528/353 |
| 3,920,768 | 11/1975 | Kwiatkowski | 528/353 |
| 4,604,437 | 8/1986 | Renner | 526/262 |
| 5,041,528 | 8/1991 | Riel et al. | 528/353 |

FOREIGN PATENT DOCUMENTS

| | | |
|---|---|---|
| 0289798 | 11/1988 | European Pat. Off. . |
| 0414381 | 2/1991 | European Pat. Off. . |
| 0776924A2 | 6/1997 | European Pat. Off. . |

*Primary Examiner*—P. Hampton-Hightower
*Attorney, Agent, or Firm*—Alston & Bird LLP

[57] ABSTRACT

An addition type polyimide resin raw material composition having high heat resistance and high corrosion resistance comprising a tetracarboxylic anhydride and/or tetracarboxylic diester compound, diamine compound and exo-3,6-epoxy-1,2,3,6-tetrahydrophthalic anhydride and/or exo-3,6-epoxy-1,2,3,6-tetrahydrophthalic monoester compound; a composition containing a prepreg; a fiber-reinforced polyimide composite prepreg, coating material and paint using them; and a curing method thereof.

26 Claims, 5 Drawing Sheets

POLIYMIDE RESIN COMPOSITION AND METHOD FOR PRODUCING PREPREG AND PAINT AND METHOD FOR CURING RESIN USING THE SAME

BACKGROUND OF THE INVENTION

The present invention relates to an addition type polyimide resin raw material composition having high heat resistance, or high heat resistance and high corrosion resistance, a composition and molded object containing a prepolymer, a prepolymer, a curing method thereof, and a coating material using the addition type polyimide resin, a polyimide resin paint, a prepreg for a fiber-reinforced resin composite material excellent in moldability and a method for producing and a method for curing a fiber-reinforced polyimide composite material.

A polyimide resin is widely used in various fields such as a paint and coating material represented by a matrix resin for various fiber-reinforced resin composite material (FRP) since the polyimide resin has excellent heat resistance and excellent corrosion resistance against inorganic and organic strong acid, weak acid, strong alkali and weak alkali and the like. However, the polyimide resin usually has a defect regarding molding that it has a inferior flowability even at high temperature.

The polyimide used as a matrix resin for a fiber-reinforced resin composite material is usually an addition reaction type polyimide which is cross-linked and cured in final process after impregnation of the fiber with the resin. The representative example of such polyimide includes PMR-15 [T. T. Serafini; JOURNAL OF APPLIED POLYMER SCIENCE, 16, 905(1972)]. PMR-15 is a polyimide in which the terminal stopper is 5-norbornane-2,3-dicarboxylic anhydride (commonly known as a nadic anhydride) and the main chain is made by condensation of benzophenone tetracarboxylic anhydride and diaminodiphenylmethane, and the reaction in the final stage of curing process progresses by ring opening addition reaction of nadic acids at both ends, therefore, it is said that no volatile component is formed during the reaction, so PMR-15 is widely used as a matrix resin for a fiber-reinforced composite material. However, PMR-15 has a problem that moldability and physical properties of the composite material decrease since pealing occurs between layers of a FRP plate due to cyclopentadiene generated by pyrolysis of the terminal stopper portion in the post process which is called as post cure and conducted after curing of the resin in which heat treatment is conducted at a temperature of not lower than 300° C. to enhance the heat resistance. Further, PMR-15 has also a problem that the pre-curing temperature can not lowered to not higher than 290° C. since nadic anhydride is used as the terminal stopper, and this problem also makes molding difficult.

For molding of a large scale fiber-reinforced composite material, what is called autoclave is generally used which can generate high temperature and high pressure condition in pre-curing. In such molding method, there are used organic supplementary materials for molding such as a bag film, sealant, packing and the like for what is called vacuum bagging which enables uniform pressurization in an autoclave. Therefore, these supplementary materials should be made of a special heat resistant resin when pre-curing temperature is high, then, there occurs difficult problems such as increasing of cost, lowering of physical properties by large thermal residual strain due to high temperature molding. Namely, molding of the polyimide has a lot of difficult problems, therefore, lowering of the pre-curing temperature is an important subject.

Further, when a fiber-reinforced resin composite material is used as a structural component or the like, strength in wet condition as well as in dry condition is very important, especially when a fiber-reinforced resin composite material is used as a structural component in aerospace apparatus filed, strength in wet condition is regarded as important. In general, there is a tendency that the strength of a resin material decreases in wet condition, therefore, improving the strength in wet condition is an important subject of the fiber-reinforced resin composite material.

The polyimide resin has an excellent corrosion resistance against acids and alkalis, and is widely used in various fields which requires corrosion resistance. However, the polyimide resin has a problem that it does not have sufficient corrosion resistance against Lewis acid and Lewis base generated for example in plating field or the like which are defined by Lewis acid-base concept, particularly against non-aqueous Lewis acid and Lewis base such as molten aluminium salts ($Al^{3+}$, $Cl^-$).

SUMMARY OF THE INVENTION

In consideration of the above-mentioned problems in the prior art, the present invention is going to provide; a polyimide resin raw material composition by which a fiber-reinforced resin composite material or molded object is obtained which has low curing temperature and is excellent in molding feature, has no possibility that volatile components derived from pyrolysis is produced in post-curing, shows high heat resistance and excellent corrosion resistance also against Lewis acid and Lewis base, and further has high strength in moisture absorbed condition; its prepolymer and a composition containing the prepolymer; a coating material, paint and prepreg for fiber-reinforced polyimide composite material using the same; and a method for curing them.

For solution of the above-described problems, the present inventors have studied intensely with respect to: an addition type polyimide composition having high heat resistance and high corrosion resistance and low curing temperature which, when applied for a fiber-reinforced resin composite material, generates no volatile component derived from a pyrolysis product in post-curing, and shows excellent moldability since resin curing temperature in pre-curing is approximately 220° C. which is lower than that of the prior art; a molded object using the composition; and a method for curing a resin using the composition: an addition type polyimide resin raw material composition which also has high strength especially in moisture absorbed condition in addition to above-mentioned characteristics; a molded object using the composition; and a method for curing a resin using the composition: and a coating material, paint and method for producing a fiber-reinforced composite material, and the like. As the result, we attained the present invention.

In accordance with the present invention, there are provided embodiments with the following (1) to (21) compositions or methods.

(1) An addition type polyimide resin raw material composition having high heat resistance, or high heat resistance and high corrosion resistance comprising a tetracarboxylic anhydride and/or tetracarboxylic diester compound, diamine compound and exo-3,6-epoxy-1,2,3,6-tetrahydrophthalic anhydride and/or exo-3,6-epoxy-1,2,3,6-tetrahydrophthalic monoester compound.

(2) A composition containing a polyamic acid prepolymer having a degree of polymerization of not more than 5, obtained by reaction of the addition type polyimide resin raw material composition having high heat resistance, or high heat resistance and high corrosion resistance of above-described (1).

(3) A composition containing a polyimide prepolymer having a degree of polymerization of not more than 5, obtained by further reaction of the composition containing a polyamic acid prepolymer of above-described (2).

(4) A polyimide resin molded object having high heat resistance, or high heat resistance and high corrosion resistance, obtained by further polymerization reaction of the composition containing a polyimide prepolymer of above-described (3).

(5) The addition type polyimide resin raw material composition having high heat resistance, or high heat resistance and high corrosion resistance according to above-described (1), wherein said diamine compound is diaminodiphenylmethane.

(6) A polyamic acid prepolymer or a composition containing a polyamic acid prepolymer having a degree of polymerization of not more than 5, obtained by reaction of the addition type polyimide resin raw material composition having high heat resistance, or high heat resistance and high corrosion resistance of above-described (5).

(7) A polyamic acid prepolymer or a composition containing a polyimide prepolymer having a degree of polymerization of not more than 5, obtained by further reaction of the polyamic acid prepolymer of above-described (6) or the composition containing a polyamic acid prepolymer of above-described (6).

(8) A polyimide resin molded object having high heat resistance and having high strength at moisture absorbed condition, or high heat resistance and high corrosion resistance and having high strength at moisture absorbed condition, obtained by further polymerization reaction of the polyimide prepolymer of above-described (7) or of the composition containing a polyimide prepolymer of above-described (7).

(9) A method for producing a prepreg for a fiber-reinforced polyimide composite material in which a reinforced fiber is impregnated with; a solution prepared by dissolving an addition type polyimide resin raw material composition having high heat resistance, or high heat resistance and high corrosion resistance comprising a tetracarboxylic anhydride and/or tetracarboxylic diester compound, diamine compound and exo-3,6-epoxy-1,2,3,6-tetrahydrophthalic anhydride and/or exo-3,6-epoxy-1,2,3,6-tetrahydrophthalic monoester compound in a solvent; a solution of a polyamic acid prepolymer prepared by reaction of the polyimide resin raw material composition solution; a solution of a polyimide prepolymer prepared by further reaction of the polyamic acid prepolymer solution; or a mixture composed of more than one of them.

(10) A method for producing a prepreg for a fiber-reinforced polyimide composite material according to above-described (9), wherein diaminodiphenylmethane is used as said diamine compound.

(11) A method for curing an addition type polyimide, wherein, in preparing a polyimide resin by curing the addition type polyimide resin raw material composition having high heat resistance, or high heat resistance and high corrosion resistance, the polyamic acid prepolymer or the polyimide prepolymer of any one of above-described (1) to (3) and (5) to (7), curing is conducted at such temperature range that the maximum temperature is from 200to 300° C.

(12) A method for curing a fiber-reinforced polyimide composite material, wherein, in preparing a fiber-reinforced polyimide composite material having high heat resistance, or high heat resistance and high corrosion resistance by laminating and curing the prepreg obtained by the method of above-described (9) or (10), curing is conducted at such temperature range that the maximum temperature is from 200 to 300° C.

(13) The method for curing a fiber-reinforced polyimide composite material according to above-described (12), wherein the heating at not less than 200° C. is conducted under pressure.

(14) A method for curing of an addition type polyimide resin, wherein, after the curing of the addition type polyimide resin according to above-described (11), post curing is conducted at a temperature from 260 to 380° C. (over said curing temperature) to release residual stress or strain and to further improve degree of crosslinking.

(15) A method for curing a fiber-reinforced polyimide composite material, wherein, after the curing of the prepreg according to above-described (12), post curing is conducted at a temperature from 260 to 380° C. (over said curing temperature) to release residual stress or strain and to further improve degree of crosslinking.

(16) A method for making a polyimide resin coating film in which a solution prepared by dissolving an addition type polyimide resin raw material composition having high heat resistance and high corrosion resistance comprising a tetracarboxylic anhydride and/or tetracarboxylic diester compound, diamine compound and exo-3,6-epoxy-1,2,3,6-tetrahydrophthalic anhydride and/or exo-3,6-epoxy-1,2,3,6-tetrahydrophthalic monoester compound in a solvent; a solution of a polyamic acid prepolymer prepared by reaction of the polyimide resin raw material composition solution; a solution of a polyimide prepolymer prepared by further reaction of the polyamic acid prepolymer solution; or a mixture composed of more than one of them, are applied as a coating material on a substrate and cured.

(17) The method for making a polyimide resin coating film according to above-described (16), wherein said diamine compound is diaminodiphenylmethane.

(18) The method for making a polyimide resin coating film according to above-described (16) or (17), wherein the film formed by applying the coating material is cured at such temperature range that the maximum temperature is from 200 to 350° C.

(19) A method for producing a polyimide resin paint in which a pigment is added to a solution prepared by dissolving an addition type polyimide resin raw material composition having high heat resistance and high corrosion resistance comprising a tetracarboxylic anhydride and/or tetracarboxylic diester compound, diamine compound and exo-3,6-epoxy-1,2,3,6-tetrahydrophthalic anhydride and/or exo-3,6-epoxy-1,2,3,6-tetrahydrophthalic monoester compound in a solvent; a solution of a polyamic acid prepolymer prepared by reaction of the polyimide resin raw material composition solution; a solution of a polyimide prepolymer prepared by further reaction of the polyamic acid prepolymer solution; or a mixture composed of more than one of them, and they are mixed.

(20) The method for producing a polyimide resin paint according to above-described (19), wherein said diamine compound is diaminodiphenylmethane.

(21) A method for making a polyimide resin applied film in which the polyimide resin paint of above-described (19) or (20) is applied, then the paint is cured at such temperature range that the maximum temperature is from 200 to 350° C.

According to the present invention, the following effects are expected.

(1) The polyimide resin of the present invention can be cured at lower temperature as compared with the conventional polyimide resin, and is excellent in moldability.

(2) The polyimide resin of the present invention has high heat resistance strength, especially manifests high strength in moisture absorbed condition.

(3) The polyimide resin of the present invention has high corrosion resistance, especially, excellent corrosion resistance against Lewis acid, Lewis base, among others, against non-aqueous Lewis acid, Lewis base such as molten metal salts.

(4) If the polyimide resin raw material composition and the composition containing a prepolymer of the present invention are used, a thick molded object or fiber-reinforced resin composite material can be obtained without causing the problems such as void, crack, peeling between layers and the like, since no volatile component is generated during pre-curing and post-curing.

(5) The polyimide resin raw material composition and the composition containing a prepolymer of the present invention are effective for formation of a coating film having the features of the above-described polyimide resin, and also can be used in the form of a paint.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF THE PREFERRED EMBODIMENTS

Figure 1:
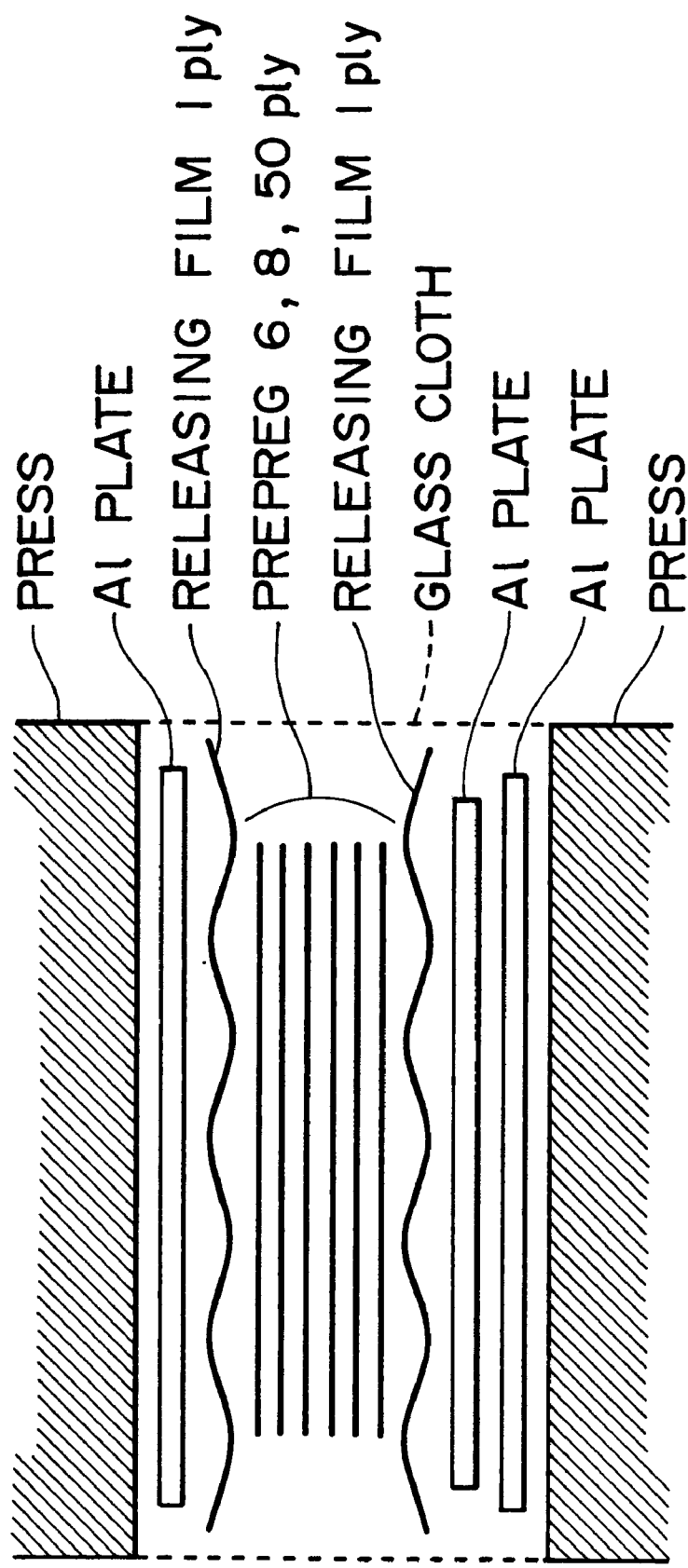
FIG. 1 is a schematic view showing laminate inserting condition in molding.

As the tetracarboxylic anhydride in the present invention, compounds represented by the following chemical formula (A) can be used.

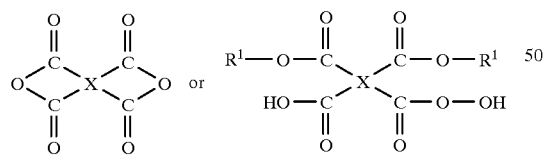

(A)

wherein, $R^1$ is hydrogen or a monovalent organic group having 1 to 8 carbon atoms, the organic group may contain —O—, —S—, —SO—, —SO$_2$— or —(CO)— alone or in combination, and a part or all of the hydrogen atoms may be substituted by a halogen atom or lower alkyl group. X is a tetravalent organic group carrying 3 to 30 carbon atoms having carbocyclic cyclic structure and/or heterocyclic cyclic structure, the tetravalent organic group may contain —O—, —S—, —SO—, —SO$_2$—, —(CO)— or —CH$_2$— alone or in combination, and a part or all of the hydrogen atoms may be substituted by a halogen atom or lower alkyl group.

The specific example of $R^1$ includes a straight-chain lower alkyl group such as a hydrogen, methyl group, ethyl group, propyl group, butyl group or the like; a branched-chain lower alkyl group such as an isopropyl group, sec-butyl group, tert-butyl group, isoamyl group, neopentyl group, 2-ethylhexyl group or the like; an aromatic group represented by a phenyl group; a heterocyclic group, and the like, and a part or all of the hydrogen atoms may be substituted by a halogen atom such as fluorine, chlorine, bromine, iodine or a lower alkyl group.

Further, X may be a tetravalent organic group carrying 3 to 30 carbon atoms having carbocyclic cyclic structure and/or heterocyclic cyclic structure, and the preferable example includes tetra-substituted benzene represented by the formula (X1) such as 1,2,4,5- or 1,2,3,4-substituted compound or the like, tetra-substituted diphenylmethane represented by the formula (X2) such as 3,4,3',4'- or 3,5,5',5'-substituted compound or the like, tetra-substituted diphenylsulfide represented by the formula (X3) such as 3,4,3',4'- or 3,5,3',5'-substituted compound or the like, tetra-substituted diphenylsulfoxide represented by the formula (X4) such as 3,4,3',4'- or 3,5,3',5'-substituted compound or the like, tetra-substituted diphenylsulfone represented by the formula (X5) such as 3,4,3',4'- or 3,5,3',5'-substituted compound or the like, tetra-substituted diphenylether represented by the formula (X6) such as 3,4,3',4'- or 3,5,3',5'-substituted compound or the like, tetra-substituted benzophenone represented by the formula (X7) such as 3,4,3',4'- or 3,5,3',5'-substituted compound or the like, and the like. The other example than the above-mentioned compounds includes a carbocyclic organic tetra-substituted compound such as a naphthylene group, anthracenyl group, biphenyl group or the like; a heterocyclic organic tetra-substituted compound such as a pyridine group, carbazole group or the like, and also those in which a part or all of the hydrogen atoms is substituted by a halogen atom such as fluorine, chlorine, bromine, iodine or a lower alkyl group. Among them, 3,4,3',4'-substituted organic groups represented by the above-described formulae (X2) to (X7).

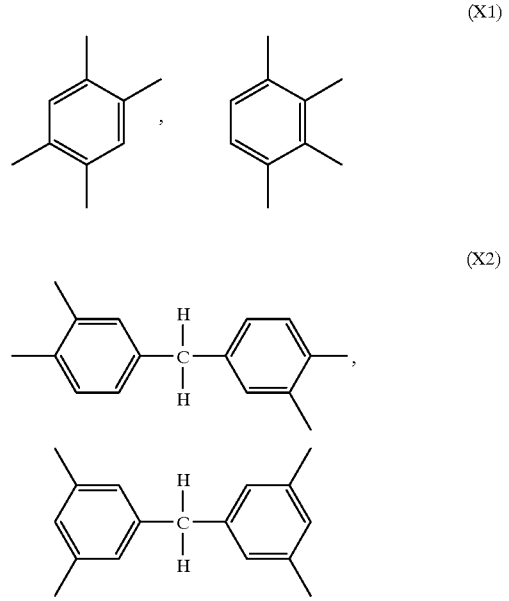

(X3) 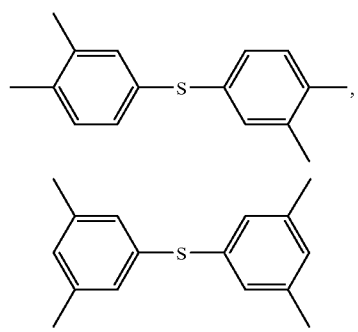

(X4) 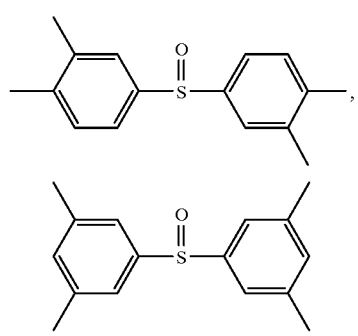

(X5) 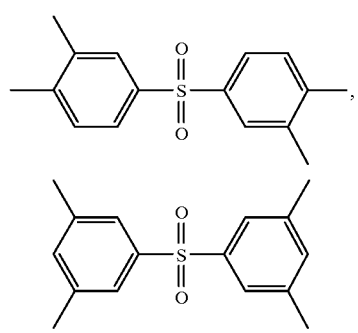

(X6) 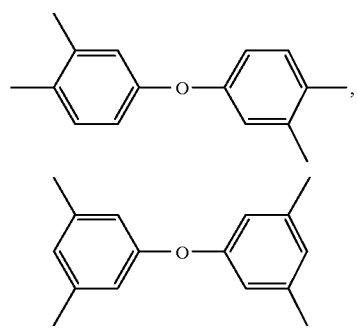

(X7) 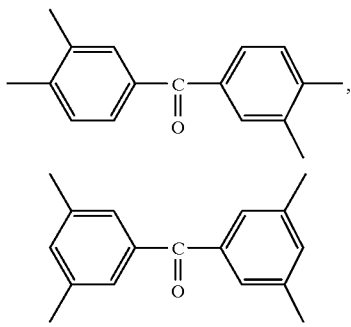

As the diamine compound of the present invention, compounds represented by the following formula (B) can be used.

$$H_2N-Y-NH_2 \qquad (B)$$

wherein, Y is a divalent organic group having 1 to 30 carbon atoms, the organic group may contain carbocyclic cyclic structure and/or heterocyclic cyclic structure, —O—, —S—, —SO—, —SO$_2$—, —(CO)— or —CH$_2$— alone or in combination, and a part or all of the hydrogen atoms may be substituted by a halogen atom or lower alkyl group.

The specific example of Y includes a straight-chain alkylene group such as a methylene group, ethylene group, propylene group, butylene group or the like; a branched-chain alkyl group having a side chain such as a 1,2-propylene group, 2-methyl-1,2-propylene group or the like; an aromatic alkylene group such as a phenylene group, toluylene group or the like; a carbopolycyclic disubstituted organic group such as a naphthylene group, anthracenyl group, biphenyl group or the like; a heterocyclic disubstituted organic group such as a pyridine group, hydrazine group, carbazole group or the like; a substituent containing an ether group represented by —O—, sulfide group represented by —S—, sulfoxide group represented by —SO—, sulfonyl group represented by —SO$_2$—, carbonyl group represented by —(CO)—, methylene group represented by —CH$_2$— or the like alone or in combination, and a part or all of the hydrogen atoms may be substituted by a halogen atom such as fluorine, chlorine, bromine or iodine or lower alkyl group.

The exo-3,6-epoxy-1,2,3,6-tetrahydrophthalic anhydride or exo-3,6-epoxy-1,2,3,6-tetrahydrophthalic monoester compound which is used as a terminal stopper in the polyimide resin of the present invention, is that which is represented by the following formula (C).

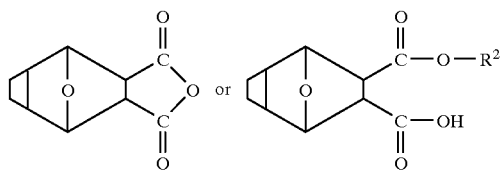
(C)

wherein, $R^2$ is hydrogen or a monovalent organic group having 1 to 8 carbon atoms, the organic group may contain —O—, —S—, —SO—, —SO$_2$— or —(CO)— alone or in combination, and a part or all of the hydrogen atoms may be substituted by a halogen atom or lower alkyl group.

The prepolymer synthesized from the above-described compounds (A), (B) and (C) first becomes the polyamic acid prepolymer represented by the formula (D) in the first process, and further becomes the polyimide prepolymer represented by the formula (E) in the proceeded reaction.

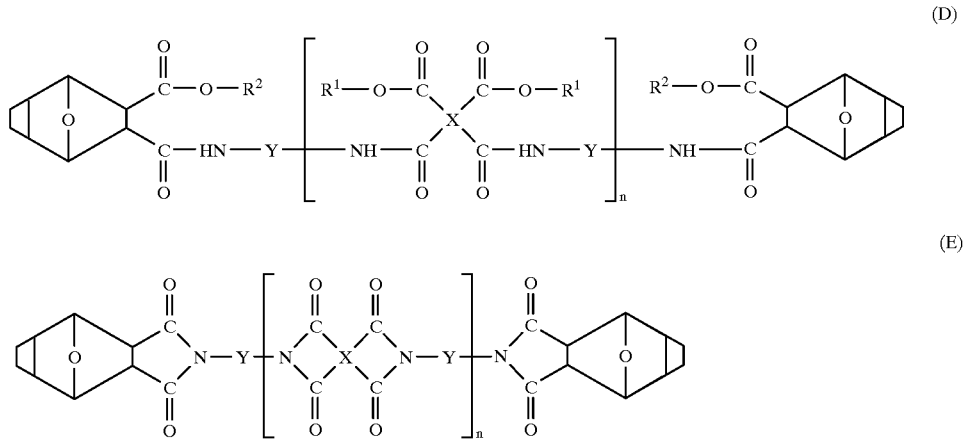

(D)

(E)

In the formulae (D) and (E), n indicates degree of polymerization, $n \leq 5$, preferably n is in the range from 1.5 to 3.5. $R^1$ and $R^2$ indicate respectively the same groups as described above. When n is smaller in this range, crosslink density increases and heat resistances is improved. However, increase of the crosslink density makes the resin hard and fragile, the density is appropriately regulated according to the use.

The present inventors have noticed that generation of the volatile component (cyclopentadiene) in post-curing PMR-15 is caused by pyrolysis of the terminal stopper portion and that pre-curing temperature of the addition reaction type polyimide prepolymer is determined by initiation temperature of the ring opening addition reaction of the terminal stopper, and have intensely studied with resect to a compound which does not lower excellent heat resistance of polyimide, does not generate pyrolysis products in post-curing and initiates ring opening reaction at a low temperature around 220° C. As the result, we have found that exo-3,6-epoxy-1,2,3,6-tetrahydrophthalic anhydride is excellent as a terminal stopper and that an addition type polyimide prepolymer utilizable for a high heat resistant fiber-reinforced resin composite material is obtained by using a solvent and a composition comprising the above-mentioned compounds (A), (B) and (C).

Further, it has been found that when exo-3,6-epoxy-, 2,3,6-tetrahydrophthalic anhydride is used as a terminal stopper, corrosion resistance of a polyimide resin is improved, and high corrosion resistance is obtained against Lewis acid, Lewis base, particularly, also against non-aqueous Lewis acid, Lewis base such as mol ten metal salts.

Further, the present inventors have studied intensely about a compound which manifests high strength in moisture absorbed condition , and have found that when a composition comprises diaminodiphenylmethane as the diamine compound (B) in the above-described composition, namely comprises tetracarboxylic anhydride and/or tetracarboxylic diester, diaminodiphenylmethane, and exo-3,6-epoxy-1,2,3, 6-tetrahydrophthalic anhydride and/or exo-3,6-epoxy-1,2,3, 6-tetrahydrophthalic monoester compound, the compound has excellent strength in moisture absorbed condition in addition to the above-mentioned properties, and we have obtained a composition containing an addition type polyimide prepolymer using the above-described composition and a solvent, which can mold a fiber-reinforced composite material which has high heat resistance and shows high strength even in moisture absorbed condition.

The solvent which can dissolve the composition composed of the compounds represented by the formulae (A), (B) and (C) or the prepolymer represented by the formula (D) or (E) used in the present invention or which is used to prepare a coating material and paint containing them includes, for example, hydrocarbon alcohols such as methanol, ethanol, propanol and the like; polar substances such as dimethylsulfoxide, dimethylformamide, N-methyl-2-pyrrolidone and the like; aromatic hydrocarbons such as toluene, xylene, benzene and the like; cellosolve hydrocarbons such as methyl cellosolve, ethyl cellosolve, cellosolve acetate and the like; ketone hydrocarbons such as methyl ethyl ketone, acetone, cyclohexanone, methyl isobutyl ketone and the like; hydrocarbons containing chlorine such as methylene chloride, ethylene chloride, tetrachloroethane, trichloroethylene, trichloroethane; furan hydrocarbons such as tetrahydrofuran, dioxane and the like; or a mixture thereof. It is desired to select a solvent system which has high affinity with molecules constituting the compound (A), especially with the ester portions represented by $R^1$, $R^2$, and to select a solvent according to degree of polymerization n.

As a pigment added when a paint is prepared using the polyimide resin raw material composition, the composition containing a polyamic acid prepolymer or the composition containing a polyimide prepolymer of the present invention, titanium oxide, iron oxide (III) or the like can be used. And, the amount to be added of the pigment is preferably from approximately 30 to 60% based on volume.

To obtain a molded object composed of the addition type polyimide composition of the present invention, particularly an excellent fiber-reinforced resin composite material which has high heat resistance, high corrosion resistance and easy moldability at low temperature, it is important to use resin curing method which utilizes feature of the resin composition of the present invention. Therefore, the feature of the resin composition of the present invention will be explained with comparative examples using PMR-15, and further, the curing method will be explained by exemplifying molding method of the fiber-reinforced resin composite material. Here, the curing temperature and the like which will be described is not limited to molding of the fiber-reinforced resin composite material.

The feature of the resin of the present invention will be describe below. If curing is initiated by raising temperature from room temperature, reaction temperature ranges of the both resins show no large difference between them in amidation reaction which is the first reaction process, and both reactions are completed below 200° C. Here, with respect to the resin of the present invention, a part of the terminal stopper is decomposed and furan is generated as a volatile component, whereas, with respect to PMR-15, there is almost no generation of a volatile component due to decomposition of the terminal stopper.

Then, addition reaction of the resin of the present invention initiates in the terminal stopper portion at not less than 200° C., while, addition reaction initiation temperature of PMR-15 is about 280° C. which is rather high temperature. Further, there is almost no generation of a volatile component due to decomposition of the terminal stopper in addition reaction in the resin of the present invention, while, the terminal stopper is decomposed in addition reaction and cyclopentadiene is generated in PMR-15. Therefore, it is evident that initiation time and addition reaction temperature of the resin of the present invention are different from those of PMR-15. Because of these differences, there occurs no void, crack, peeling or the like in the molded object composed of the resin of the present invention and the molding is easy since the resin of the present invention can be cured at lower temperature, and generates a volatile component only before curing and no volatile component in curing, while, void, crack, peeling and the like are easy to occur in the molded object composed of PMR-15 and the molding is difficult due to high temperature curing and generation of a volatile component in curing.

Therefore, when a fiber-reinforced resin composite material is molded using the resin of the present invention, or a paint, adhesive, electronic component such as a substrate and sealing component, varnish, corrosion resistant coating film and the like are molded using the resin of the present invention, first, the solvent used for molding, by products generated and the volatile component (furan) due to partial pyrolysis of the terminal stopper are vaporized at a temperature of not more than 200° C., then, in the case of a fiber-reinforced composite material, pre-curing is conducted at a temperature from 200 to 300° C., for example at 220° C., and in the case of the other molded objects, curing is conducted at a temperature from 200 to 300° C., in consideration of the above-mentioned feature of the resin of the present invention. Thereafter, for acceleration of release of thermal stress and strain and addition reaction and improvement of heat resistance, post-curing is conducted at a temperature from 260° C. (not less than the pre-curing temperature, and not less than the curing temperature in the case of the other molded objects) to 380° C., for example at 350° C. Of course, during these processes, void, crack, peeling and the like due to the pyrolyzable volatile components are not generated. On the other hand, when a fiber-reinforced resin composite material is molded using PMR-15, first, the solvent used for molding and by products are vaporized at a temperature of not more than 200° C., then, pre-curing is conducted at a temperature from 270 to 320° C., for example at 290° C., thereafter, for release of thermal stress and strain and improvement of heat resistance, post-curing is conducted at a temperature from not less than the pre-curing temperature to 380° C., for example at 350° C. However, in this post-curing, since the volatile component (cyclopentadiene) is generated by partial pyrolysis of the terminal stopper, void, crack, peeling and the like easily occur.

Further, when the resin of the present invention is used for formation of a coating film or is used in the form of a paint for formation of painted film, heat curing is conducted at a temperature selected in accordance with use condition, in a range from not less than 200° C. which is the lower limit temperature for curing the resin to 350° C. which is the maximum temperature at which curing is saturated. Namely, in this temperature range, it is preferable that heating is conducted at a lower temperature if the resin is pre-cured at a lower temperature and may be further cured at the temperature when in use, and heating is conducted at a higher temperature if pre-curing at a higher temperature is advantageous as use condition.

Condition of a prepolymer may be optionally selected according to form of a molded object and molding method and the like. Namely, when a molded object is made by using polyimide alone or by filling a chopped fiber, it is desirable to use a polyimide prepolymer. However, when the prepolymer is used as a matrix resin for a fiber-reinforced resin composite material, the prepolymer may be used for impregnation in the form of a polyimide prepolymer. In consideration of impregnation characteristic of the resin into a reinforced fiber, it is advantageous to use the prepolymer in the form of a polyamic acid prepolymer which is a precursor of the polyimide prepolymer, and also when the resin is used as a coating material or is used as a paint by mixing a pigment, the polyamic acid prepolymer is more advantageous. Further, to obtain excellent impregnation characteristic, it is very effective that the anhydride of the general formula (A) and the terminal stopper exo-3,6-epoxy-1,2,3,6-tetrahydrophthalic anhydride of the general formula (C) among raw material monomers are converted to monoesters, and these monoesters and the compound (B) are dissolved in a low boiling point solvent such as alcohol or the like and impregnated in a fiber in the form of monomers, if necessary they are converted to a polyamic acid prepolymer or optionally further to a polyimide prepolymer on the fiber to obtain a intermediate material for molding, or the polyamic acid prepolymer is dissolved in a low boiling point solvent such as alcohol, and the resulting solution is impregnated on a fiber to obtain a intermediate material for molding.

Depending on reaction conditions, there is obtained a prepolymer in which the raw material monomers, the polyamic acid prepolymer, the polyimide prepolymer and the like coexist, such reaction mixture or a mixture obtained by suitably blending them can be used.

Selections of polymerization methods of the prepreg and conditions of the prepolymer (namely, monomer, amic acid or imide) can be optionally made according to molding method of the intermediate material and required specification of the intermediate material. In carrying out the present invention, there is no limitation regarding these method.

Further, as the reinforcing fiber in the fiber-reinforced resin composite material using the polyimide resin of the present invention, any fiber which is used as a reinforcing fiber for an ordinary fiber-reinforced resin composite material such as a carbon fiber, glass fiber and various organic fibers can be used, and the reinforcing fiber may be used in any form such as a bundle oriented in one direction, a fabric, a knit and the like. Further, hybrid of a carbon fiber with glass fiber or a carbon fiber with them may be used, and there is no limitation.

The above-described addition type polyimide resin raw material composition, composition containing a prepolymer or a prepolymer, molded object and method for curing a resin are not limited to a fiber-reinforced resin composite material, and also useful for a high heat resistant resin, or a high heat resistant and high corrosion resistant resin, a high heat resistant and high corrosion resistant resin which needs strength especially at high temperature and moisture absorbed condition, an adhesive, a resin component for a paint, an electronic component such as a substrate and sealing component, an insulating varnish, a corrosion resistant structural material, a corrosion resistant coating film and the like.

WORKING EXAMPLES

The present invention will be further specifically described using the following examples.

Example 1

To a 1 liter flask were added 50.00 g of benzophenone tetracarboxylic dianhydride and 69.89 g of methanol, and the resulting mixture was stirred under reflux in a water bath kept at 90° C. Ten minutes after initiation of the stirring, solid components disappeared, 3 hours after, the temperature was lowered to room temperature to obtain a 50% by weight methanol solution of benzophenone tetracarboxylic dimethyl ester (A1) (process I).

In the same manner, to a 1 liter flask were added 24.00 g of exo-3,6-epoxy-1,2,3,6-tetrahydrophthalic anhydride and 33.26 g of methanol, and the resulting mixture was stirred under reflux in a water bath kept at 90° C. Ninety minutes after initiation of the stirring, solid components disappeared, 3 hours after, the temperature was lowered to room temperature to obtain a 50% by weight methanol solution of exo-3,6-epoxy-1,2,3,6-tetrahydrophthalic monomethyl ester (C1) (process II).

Diaminodiphenylmethane (B1) was used as the diamine compound (B). The 50% by weight methanol solution of (A1) (88.86 g), the compound (B1) (33.73 g), the 50% by weight methanol solution of (C1) (43.68 g) and methanol (33.73 g) were blended so that molar ratio (A1):(B1):(C1) was 2.087:3.087:2.000 to prepare a 50% by weight methanol solution of an addition type polyimide resin raw material composition for a prepreg (process III).

The 50% by weight methanol solution of the addition type polyimide resin raw material composition for a prepreg obtained in the above-described process (III) was dropped on a 180×150 mm W-2447 (carbon fiber: Hercules AS-4 (1.8 g/cm$^3$) cloth material) manufactured by Fiberite so that resin content was 35% by weight, this carbon fiber was dried at ambient temperature for 24 hours to evaporate a solvent methanol, to obtain a prepreg containing not more than 1% residual solvent (process IV).

Figure 2:
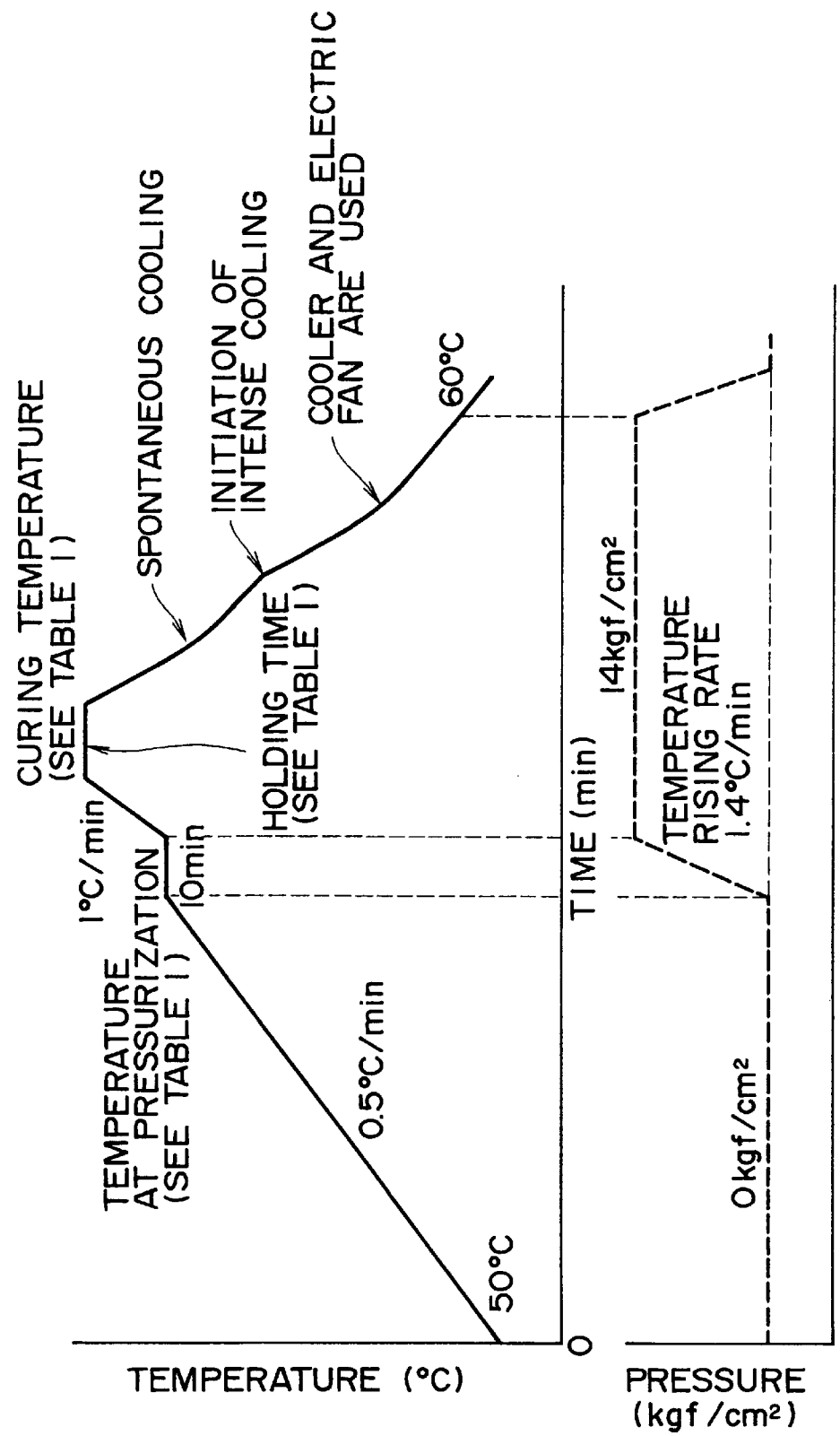
FIG. 2 is a graph showing pre-curing molding condition (temperature rising pattern model)

Six ply of thus produced prepregs were piled up all in 0° direction, and pre-curing molding was conducted using a hot press. Inserted condition of the laminate in molding is shown in FIG. 1. Molding conditions are as follows. Namely, the temperature was raised from 50° C. to 199° C. at a rate of 0.5° C./min. The temperature was kept at 199° C. for 10 minutes, during this time, the pressure was raised up to 14 kgf/cm$^2$ at a rate of 1.4 kgf/(cm$^2$·min). The pressure was kept at 14 kgf/cm$^2$ and the temperature was raised from 199° C. to 218° C. which was pre-curing temperature at a rate of 1° C./min, and the pre-curing temperature 218° C. was kept for 90 minutes. After that, spontaneous cooling was conducted, when the temperature lowered to 60° C., pressure reduction was conducted down to 0 kgf/cm$^2$, and when the temperature lowered to room temperature, the laminate was took out (process V). The temperature rising pattern model in pre-curing is shown in FIG. 2, and the molding conditions are shown in Table 1 together with those of the other examples.

TABLE 1

| | Molding condition of pre-curing and post-curing | | | |
|---|---|---|---|---|
| | Pressuring | Curing process | | Post-curing |
| Sample name | initiating temperature | Temperature (°C.) | Time (min) | temperature (°C.) |
| Example 1 | 199 | 218 | 90 | 347 |
| Example 2 | 210 | 290 | 60 | 350 |
| Example 3 | 210 | 290 | 60 | 350 |
| Example 4 | 210 | 290 | 60 | 350 |
| Example 5 | 210 | 290 | 60 | 350 |
| Comparative Example 1 | 199 | 218 | 90 | 243 |
| Comparative Example 2 | 199 | 218 | 90 | 347 |
| Comparative Example 3 | 245 | 290 | 60 | 350 |
| Comparative Example 4 | 210 | 250 | 60 | 300 |

Figure 3:
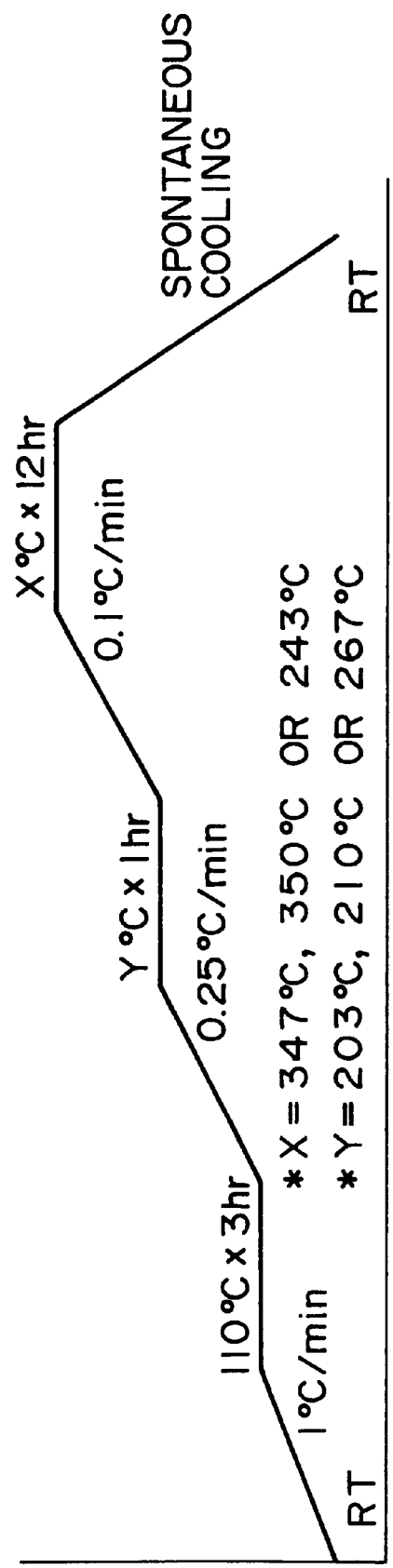
FIG. 3 is a graph showing post-curing condition (temperature rising pattern)

The pre-curing completed laminate was charged in an oven, and post-curing was conducted. The post-curing was conducted under no restriction, first the temperature was raised from room temperature to 110° C. at a rate of 1° C./min and the temperature was kept at 110° C. for 3 hours, then the temperature was raised from 110° C. to 267° C. at a rate of 0.25° C./min and the temperature was kept at 267° C. for 1 hour, then the temperature was raised from 267° C. to 347° C. at a rate of 0.1° C./min and the temperature was kept at 347° C. for 12 hours, then spontaneous cooling was conducted down to room temperature and the sample was took out, to obtain a fiber-reinforced composite material (process VI). The temperature rising pattern model in pre-curing is shown in FIG. 3, and the post-curing conditions are shown in Table 1 together with those of the other examples.

Example 2

The same procedure as the process (III) of Example 1 was conducted to prepare a 50% by weight methanol solution of an addition type polyimide resin raw material composition for a prepreg containing A1, B1 and C1, and the resulting solution was stirred under reflux in a water bath kept at 90° C. for 5 hours to prepare a methanol solution of a polyamic acid prepolymer and polyimide prepolymer (a mixed solution of a polyamic acid prepolymer and polyimide prepolymer).

The same procedure as the process (IV) of Example 1 was conducted except that the methanol solution of the polyamic acid prepolymer and polyimide prepolymer was used instead of the 50% by weight methanol solution of an addition type polyimide resin raw material composition for a prepreg, to produce prepregs, and 8 ply of thus produced prepregs were piled up all in 0° direction, and pre-curing molding was conducted using a hot press (see FIG. 1). For molding, the temperature was raised from 50° C. to 210° C. at a rate of 0.5° C./min. The temperature was kept at 210° C. for 10 minutes, during this time, the pressure was raised up to 14 kgf/cm$^2$ at a rate of 1.4 kgf/(cm$^2$·min). The pressure was kept at 14 kgf/cm$^2$ and the temperature was raised from 210° C. to 290° C. which was pre-curing temperature at a rate of 1° C./min, and the pre-curing temperature 290° C. was kept for 60 minutes. After that, spontaneous cooling was conducted, when the temperature lowered to 60° C., pressure reduction was conducted down to 0 kgf/cm², and when the temperature lowered to room temperature, the laminate was took out. The temperature rising pattern model in pre-curing molding is shown in FIG. 2, and the molding conditions are shown in Table 1.

Then, the pre-curing completed laminate was charged in an oven, and post-curing was conducted. The post-curing was conducted under no restriction, first the temperature was raised from room temperature to 110° C. at a rate of 1° C./min and the temperature was kept at 110° C. for 3 hours, then the temperature was raised from 110° C. to 210° C. at a rate of 0.25° C./min and the temperature was kept at 210° C. for 1 hour, then the temperature was raised from 210° C. to 350° C. at a rate of 0.1° C./min and the temperature was kept at 350° C. for 12 hours, then spontaneous cooling was conducted down to room temperature and the sample was took out, to obtain a fiber-reinforced composite material. The temperature rising pattern model in post-curing is shown in FIG. 3, and the post-curing conditions are shown in Table 1.

Example 3

The same procedures as the processes (I), (II) of Example 1 were conducted to prepare a 50% by weight methanol solution of (A1) and a 50% by weight methanol solution of (C1). As the diamine compound (B), 2, 6-diaminopyridine (B2) was used. The 50% by weight methanol solution of (A1) (88.86 g), the compound (B2) (18.56 g), the 50% by weight methanol solution of (C1) (43.68 g) and methanol (18.56 g) were blended so that molar ratio (A1):(B3):(C1) was 2.087:3.087:2.000 to prepare a 50% by weight methanol solution of an addition type polyimide resin raw material composition for a prepreg, the resulting solution was stirred under reflux in a water bath kept at 90° C. for 5 hours to prepare a methanol solution of a polyamic acid prepolymer and polyimide prepolymer.

A prepreg was prepared using the methanol solution of the polyamic acid prepolymer and polyimide prepolymer in the same manner as that of Example 2. Molding was conducted in the same manner and temperature rising pattern as those of Example 2 and under conditions described in Table 1, to obtain a laminate which had completed pre-curing. Further, the same temperature rising pattern as that of Example 2 was conducted to obtain a fiber-reinforced resin composite material.

Example 4

The same procedures as the processes (I), (II) of Example 1 were conducted to prepare a 50% by weight methanol solution of (A1) and a 50% by weight methanol solution of (C1). As the diamine compound (B), 1, 5-naphthalenediamine (B3) was used. The 50% by weight methanol solution of (A1) (88.86 g), the compound (B3) (26.91 g), the 50% by weight methanol solution of (C1) (43.68 g) and methanol (26.91 g) were blended so that molar ratio (A1):(B3):(C1) was 2.087:3.087:2.000 to prepare a 50% by weight methanol solution of an addition type polyimide resin raw material composition for a prepreg, the resulting solution was stirred under reflux in a water bath kept at 90° C. for 5 hours to prepare a methanol solution of a polyamic acid prepolymer and polyimide prepolymer.

A prepreg was prepared using the methanol solution of the polyamic acid prepolymer and polyimide prepolymer in the same manner as that of Example 2, and molding was conducted in the same manner and temperature rising pattern as those of Example 2 and under conditions described in Table 1, to obtain a laminate which had completed pre-curing. Further, the same temperature rising pattern as that of Example 2 was conducted to obtain a fiber-reinforced resin composite material.

Example 5

To a 1 liter flask were added 420.00 g of benzophenone tetracarboxylic dianhydride and 503.52 g of methanol, a 50% by weight methanol solution of (A1) was prepared in the same manner as that of the process I of Example 1.

In the same manner, 200.00 g of exo-3,6-epoxy-1,2,3,6-tetrahydrophthalic anhydride and 238.57 g of methanol were added, and a 50% by weight methanol solution of (C1) was prepared in the same manner as that of Example 1.

The 50% by weight methanol solution of (A1) (888.59 g), the compound (B1) (337.29 g), the 50% by weight methanol solution of (C1) (436.82 g) and methanol (337.29 g) were blended so that molar ratio (A1):(B1):(C1) was 2.087:3.087:2.000 to prepare a 50% by weight methanol solution of an addition type polyimide resin raw material composition for a prepreg, the resulting solution was stirred under reflux in a water bath kept at 90° C. for 5 hours to prepare a methanol solution of a polyamic acid prepolymer and polyimide prepolymer.

A 300×300 mm prepreg was produced using the methanol solution of a polyamic acid prepolymer and polyimide prepolymer in the same manner as that of Example 2, and 50 ply of thus produced prepregs were piled up in 0°, ±45° and 90° direction, and pre-curing molding was conducted using a hot press. Inserted condition of the laminate in molding is shown in FIG. 1. For molding, the temperature was raised from 50° C. to 210° C. at a rate of 0.5° C./min. The temperature was kept at 210° C. for 60 minutes, further, the pressure was raised up to 14 kgf/cm² at a rate of 1.4 kgf/(cm²·min) with keeping the temperature for 10 minutes. The pressure was kept at 14 kgf/cm² and the temperature was raised from 210° C. to 290° C. which was pre-curing temperature at a rate of 1° C./min, and the pre-curing temperature 290° C. was kept for 60 minutes. After that, spontaneous cooling was conducted, when the temperature lowered to 60° C., pressure reduction was conducted down to 0 kgf/cm², and when the temperature lowered to room temperature, the laminate was took out. The pre-curing conditions are shown in Table 1.

Then, the pre-curing completed laminate was charged in an oven, and post-curing was conducted. The post-curing was conducted under no restriction, first the temperature was raised from room temperature to 110° C. at a rate of 1° C./min and the temperature was kept at 110° C. for 3 hours, then the temperature was raised from 110° C. to 210° C. at a rate of 0.25° C./min and the temperature was kept at 210° C. for 1 hour, then the temperature was raised from 210° C. to 350° C. at a rate of 0.1° C./min and the temperature was kept at 350° C. for 12 hours, then spontaneous cooling was conducted down to room temperature and the sample was took out, to obtain a thick fiber-reinforced resin composite material. The temperature rising pattern in post-curing is shown in FIG. 3, and the post-curing conditions are shown in Table 1.

Example 6

The same procedure as the process (III) of Example 1 was conducted to prepare a 50% by weight methanol solution of an addition type polyimide resin raw material composition containing A1, B1 and C1, and the resulting solution was stirred under reflux in a water bath kept at 90° C. for 5 hours to prepare a methanol solution of a polyamic acid prepolymer and polyimide prepolymer (a mixed solution of a polyamic acid prepolymer and polyimide prepolymer).

This solution was coated on a stainless plate, and was dried at room temperature to evaporate solvent methanol (residual solvent is not more than 1%). Then, the stainless plate on which the coating film was formed was heated, to cure the coating film. The heating conditions were as follows. The temperature was raised from 50° C. to 210° C. at a rate of 0.5° C./min and was raised from 210° C. to 267° C. at a rate of 0.25° C./min, and the temperature was kept at 267° C. for 1 hour, then, the temperature was raised from 267° C. to 350° C. at a rate of 0.1° C./min, and the temperature was kept at 350° C. for 12 hours, then spontaneous cooling was conducted down to room temperature and the sample was took out, to obtain a 30 μm thick sample of the coating film.

Example 7

The same procedure as that of Example 6 was conducted to prepare a methanol solution of a polyamic acid prepolymer and polyimide prepolymer (a mixed solution of a polyamic acid prepolymer and polyimide prepolymer). To this 50% by weight methanol solution (100 g), rutile titanium dioxide (1600 mesh) as a pigment was added to obtain a concentration of 30% by volume, they were mixed, and the resulting mixture was painted on a stainless plate, and was dried at room temperature for 24 hours to evaporate solvent methanol (residual solvent is not more than 1%). Then, the stainless plate on which the painted film was formed was heated, to cure the painted film. The heating conditions were as follows. The temperature was raised from 50° C. to 210° C. at a rate of 0.5° C./min and was raised from 210° C. to 267° C. at a rate of 0.25° C./min, and the temperature was kept at 267° C. for 1 hour, then, the temperature w as raised from 267° C. to 350° C. at a rate of 0.1° C./min, and the temperature was kept at 350° C. for 12 hours, then spontaneous cooling was conducted down to room temperature and the sample was took out, to obtain a 30 μm thick sample of the painted film.

Both of the coating film of Example 6 and the painted film of Example 7 showed excellent adhesion (in the tape peeling test using 100 2 mm square lattices, result was 100/100, namely no peeling), and had glass transition temperatures not less than 360° C. which mean excellent heat resistance.

Comparative Example 1

The same procedures as that of processes (I) to (V) of Example 1 were conducted to obtain a pre-curing completed laminate. The pre-curing completed laminate was charged in an oven, and post-curing was conducted. The post-curing was conducted under no restriction, first the temperature was raised from room temperature to 110° C. at a rate of 1° C./min and the temperature was kept at 110° C. for 3 hours, then the temperature was raised from 110° C. to 203° C. at a rate of 0.25° C./min and the temperature was kept at 203° C. for 1 hour, then the temperature was raised from 203° C. to 243° C. at a rate of 0.1° C./min and the temperature was kept at 243° C for 12 hours, then spontaneous cooling was conducted down to room temperature and the sample was took out, to obtain a fiber-reinforced composite material (see FIG. 3, Table 1).

Comparative Example 2
PMR-15

The same procedure as that of process (I) of Example 1 was conducted to obtain a 50% by weight methanol solution of (A1). In the same manner, to a 1 liter flask were added 24.00 g of 5-norbornene-2,3-dicarboxylic anhydride and 33.37 g of methanol, and the resulting mixture was stirred under reflux in a water bath kept at 90° C. Ninety minutes after initiation of the stirring, solid components disappeared, 3 hours after, the temperature was lowered to room temperature to obtain a 50% by weight methanol solution of 5-norbornene-2,3-dicarboxylic monomethyl ester.

The 50% by weight methanol solution of (A1) (89.05 g), the compound (B1) (33.80 g), the 50% by weight methanol solution of 5-norbornene-2,3-dicarboxylic monomethyl ester (43.34 g) and methanol (33.80 g) were blended so that molar ratio (A1):(B1):5-norbornane-2,3-dicarboxylic monomethyl ester (the composition of PMR-15) is 2.087:3.087:2.000 to prepare a 50% by weight methanol solution of the PMR-15 raw material composition.

A prepreg was produced in the same manner as that of Example 1 except that the 50% by weight methanol solution of the PMR-15 raw material composition as a solution of a polyimide composition, and molding was conducted in the same manner as that of Example 1 to obtain a pre-curing completed laminate (see FIG. 2, Table 1). A fiber-reinforced composite material was obtained in the same manner as that of Example 1 (see FIG. 3, Table 1).

Comparative Example 3
PMR-15

The same procedure as that of Comparative Example 2 was conducted to obtain a 50% by weight methanol solution of the PMR-15 raw material composition, and the resulting solution was stirred under reflux in a water bath kept at 90° C. for 5 hours to prepare a methanol solution of a polyamic acid prepolymer and polyimide prepolymer.

A prepreg was produced using the methanol solution of the polyamic acid prepolymer and polyimide prepolymer in the same manner as that of Example 2. And 8 ply of thus produced prepregs were piled up all in 0° direction, and pre-curing molding was conducted using a hot press (see FIG. 1). For molding, the temperature was raised from 50° C. to 245° C. at a rate of 0.5° C./min. The temperature was kept at 245° C. for 10 minutes, during this time, the pressure was raised up to 14 kgf/cm$^2$ at a rate of 1.4 kgf/(cm$^2$·min). The pressure was kept at 14 kgf/cm$^2$ and the temperature was raised from 245° C. to 290° C. which was pre-curing temperature at a rate of 1° C./min, and the pre-curing temperature 290° C. was kept for 60 minutes. After that, spontaneous cooling was conducted, when the temperature lowered to 60° C., pressure reduction was conducted down to 0 kgf/cm$^2$, and when the temperature lowered to room temperature, the laminate was took out (see FIG. 2, Table 1).

Then, the pre-curing completed laminate was charged in an oven, and post-curing was conducted. The post-curing was conducted under no restriction, first the temperature was raised from room temperature to 110° C. at a rate of 1° C./min and the temperature was kept at 110° C. for 3 hours, then the temperature was raised from 110° C. to 267° C. at a rate of 0.25° C./min and the temperature was kept at 267° C. for 1 hour, then the temperature was raised from 267° C. to 350° C. at a rate of 0.1° C./min and the temperature was kept at 350° C. for 12 hours, then spontaneous cooling was conducted down to room temperature and the sample was took out, to obtain a fiber-reinforced composite material (see FIG. 3, Table 1).

Comparative Example 4

The same procedure as that of process (I) of Example 1 was conducted to obtain a 50% by weight methanol solution of (A1). In the same manner, to a 1 liter flask were added 24.00 g of maleic anhydride and 39.68 g of methanol, and the resulting mixture was stirred under reflux in a water bath kept at 90° C. Thirty minutes after initiation of the stirring, solid components disappeared, 3 hours after, the temperature was lowered to room temperature to obtain a 50% by weight methanol solution of maleic monomethyl ester.

The 50% by weight methanol solution of (A1) (98.05 g), the compound (B1) (33.80 g), the 50% by weight methanol solution of maleic monomethyl ester(28.49 g) and methanol (33.80 g) were blended so that molar ratio (A1):(B1) maleic monomethyl ester is 2.087:3.087:2.000 to prepare a 50% by weight methanol solution of the polyimide raw material composition. The resulting solution was stirred under reflux in a water bath kept at 90° C. for 5 hours to prepare a methanol solution of a polyamic acid prepolymer and polyimide prepolymer.

A prepreg was produced using the methanol solution of the polyamic acid prepolymer and polyimide prepolymer in the same manner as that of Example 2. And 8 ply of thus produced prepregs were piled up all in 0° direction, and pre-curing molding was conducted using a hot press (see FIG. 1). For molding, the temperature was raised from 50° C. to 210° C. at a rate of 0.5° C./min. The temperature was kept at 210° C. for 10 minutes, during this time, the pressure was raised up to 14 kgf/cm$^2$ at a rate of 1.4 kgf/(cm$^2$.min). The pressure was kept at 14 kgf/cm$^2$ and the temperature was raised from 210° C. to 250° C. which was pre-curing temperature at a rate of 1° C./min, and the pre-curing temperature 250° C. was kept for 60 minutes. After that, spontaneous cooling was conducted, when the temperature lowered to 60° C., pressure reduction was conducted down to 0 kgf/cm$^2$, and when the temperature lowered to room temperature, the laminate was took out (see FIG. 2, Table 1).

Then, the pre-curing completed laminate was charged in an oven, and post-curing was conducted. The post-curing was conducted under no restriction, first the temperature was raised from room temperature to 110° C. at a rate of 10° C./min and the temperature was kept at 110° C. for 3 hours, then the temperature was raised from 110° C. to 267° C. at a rate of 0.25° C./min and the temperature was kept at 267° C. for 1 hour, then the temperature was raised from 267° C. to 300° C. at a rate of 0.1° C./min and the temperature was kept at 300 ° C. for 12 hours, then spontaneous cooling was conducted down to room temperature and the sample was took out, to obtain a fiber-reinforced composite material (see FIG. 3, Table 1).

Example 8

Corrosion resistance evaluation tests were conducted using the samples of the fiber-reinforced composite materials obtained in Example 1 to 4 and Comparative Example 3 and 4, of the coating film obtained in Example 6 and of painted film obtained in Example 7.

In these tests, each sample was immersed in atmospheres (in the condition of molten salt) of the atmosphere (atmosphere 1) of metal Al$^{3+}$, ligand Cl$^-$, the atmosphere (atmosphere 2) of metal Ag$^+$, ligand Cl$^-$, the atmosphere (atmosphere 3) of metal Ag$^+$, ligand CN$^-$, the atmosphere (atmosphere 4) of metal Hg$^+$, ligand Br$^-$, respectively, change of the sample condition was observed. The results are shown in Table 5. Here, the corrosion resistance is evaluated by the term in which the condition before immersion can be maintained, and in Table 5, A indicates maintenance not less than 1 month, B indicates maintenance for about 1 month, C indicates maintenance for several days, D indicates maintenance for several hours.

The results of the above-described Examples and Comparative Examples lead to the following analyses.

(1) Easy moldability (molding temperature)

Evaluation of easy moldability (molding temperature) is clear from comparison between the results of Example 1 and Comparative Example 1 or Comparative Example 2, the results are shown in Table 2.

Figure 4:
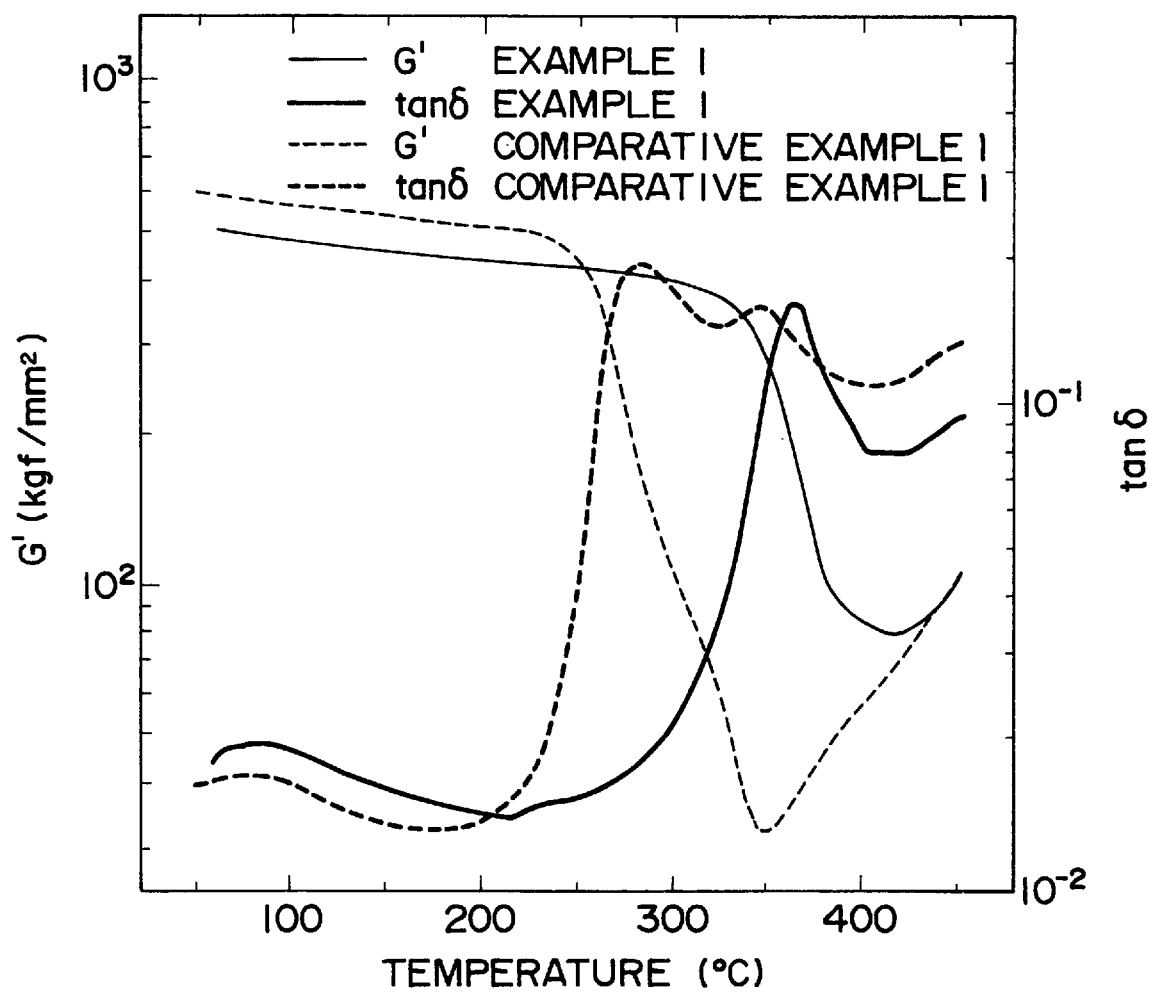
FIG. 4 is a graph showing relation between post-curing temperature and G' and tan δ.

The post-curing temperature of Example 1 is different from that of Comparative Example 1 when the temperature is over 260° C. The resin of the present invention has a feature that the addition reaction temperature range is wide. The result of the dynamic viscoelastic characteristic test indicates that curing of the resin of Comparative Example 1 is not complete since there are two peaks in tan δ which means glass transition temperature (see FIG. 4). From the comparison, it is clear that regulations of temperature and time are important in curing the resin of the present invention.

The comparison between Example 1 and Comparative Example 2 (PMR-15) teaches that when the same molding temperature (post-curing temperature) as that of the resin of the present invention is applied to Comparative Example 2 (PMR-15), an excellent molded object can not be obtained. From the result, low temperature molding feature (about 70° C. reduction of curing temperature) of the resin of the present invention is evident.

TABLE 2

Condition between layers and glass transition temperature

| | Condition between layers | Glass transition (°C.) |
|---|---|---|
| Example 1 | good | 363 |
| Example 2 | good | 367 |
| Example 3 | good | 421 |
| Example 4 | good | 392 |
| Example 5 | good | — |
| Comparative Example 1 | a little voids | 281, 342* |
| Comparative Example 2 | a lot of voids and peeling | cannot measure |
| Comparative Example 3 | a little voids but no problem | 369 |
| Comparative Example 4 | a lot of voids | 272 |

Condition between layers: Condition between layers after post-curing is recognized with naked eyes
Glass transition temperature: Peak temperature of tan¢ calculated from the storage elastic modulus and complex elastic modulus of the dynamic viscoelastic measuring result
*Since there are two peaks of tan¢, the both peaks are shown.

(2) Heat resistance and Heat resistance strength

Figure 5:
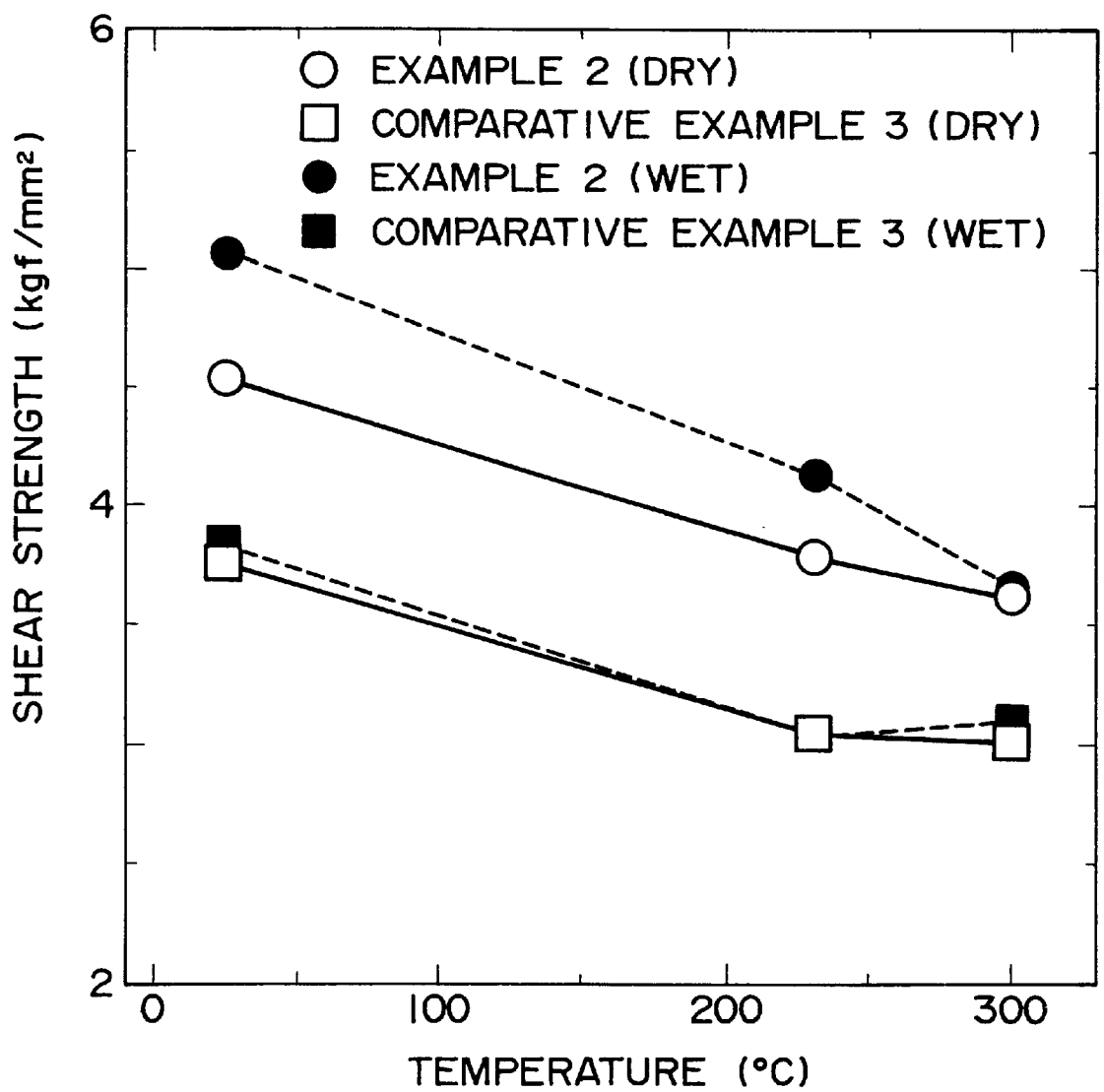
FIG. 5 is a graph showing relation between temperature, moist condition and shear strength between layers.

With respect to heat resistance, there is glass transition temperature as one index which shows in general heat resistance of a resin, this glass transition temperature is calculated from the peak temperature of tanδ shown by relation between the storage elastic modulus (G') and complex elastic modulus of the dynamic viscoelastic measuring result, and shown in Table 2. With respect to Example 1 and Comparative Example 1, relation between post-curing temperature and storage elastic modulus (G') and tan δ is shown in FIG. 5. In table 2, it is clear that the results of Examples 1 to 5 are not less than the result of Comparative Example 3 using PMR-15 which is a representative compound of the prior art, and the glass transition temperatures of Examples 3 and 4 are about 50° C. higher than that of PMR-15 used in Comparative Example 3.

Heat resistance strength was evaluated with respect to Example 2 and Comparative Example 3 that have approximately the same glass transition temperature. The results of the test for shear strength between layers are shown in FIG. 5 and Table 3, the results of the test for compression strength are shown in Table 4. These results indicate that the resin of Example 2 has higher heat resistance strength than that of PMR-13 used in Comparative Example 3 which is representative compound of the prior art, and the shear strength between layers in dry condition of the resin of Example 2 is about 1.21 times higher or more higher strength than that of Comparative Example 3.

TABLE 3

Shear strength between layers

| | | Shear strength between layers (kgf/mm²) | | |
|---|---|---|---|---|
| | | 23° C. | 230° C. | 300° C. |
| Example 2 | Dry condition | 4.54 | 3.78 | 3.61 |
| | Moisture absorbed condition | 5.07 | 4.14 | 3.66 |
| Comparative Example 3 | 210 | 3.75 | 3.04 | 3.01 |
| | 210 | 3.83 | 3.03 | 3.09 |

Shear strength between layers: ILSS measuring (according to ASTM D-2344)
Moisture absorbed condition: 49° C., 90% RH, 30 days

TABLE 4

Compression strength

| | | Compression strength (kgf/mm²) |
|---|---|---|
| Example 2 | Dry condition | 6310 |
| | Moisture absorbed condition | 6120 |
| Comparative Example 3 | 210 | 6020 |
| | 210 | 6870 |

Compression strength: According to JIS K-7076
Moisture absorbed condition: 49° C., 90% RH, 30 days (3) Strength in moisture absorbed condition.

The results of the test for shear strength between layers are shown in FIG. 5 and Table 3, and the results of the test for compression strength are shown in Table 4. PMR-15 used in Comparative Example 3 which is representative compound of the prior art manifests equal or a little lower strength in moisture absorbed condition as compared with that in dry condition. The resin of the present invention used in Example 2 which has high heat resistance and manifests high strength in moisture absorbed condition, has higher strength than that of Comparative Example 3 in dry condition. Further, for example, shear strength between layers in moisture absorbed condition of the resin of the present invention is 1.12 times higher than that in dry condition. Therefore, it is clear that the resin of the present invention has feature remarkably different from that of PMR-15 of Comparative Example 3.

(4) Thick moldability

The results of Example 5 show that the resin of the present invention has no problem such as void, crack, peeling between layers and has extremely excellent moldability.

(5) Corrosion resistance

The results of Example 8 are shown Table 5, and the results show that the resin of the present invention has excellent corrosion resistance not only against usual acid, alkali but also against Lewis acid, Lewis base such as molten metal salts.

TABLE 5

Results of corrosion resistance evaluation test

| | Immersion atmosphere | | | |
|---|---|---|---|---|
| Sample | Atmosphere 1 | Atmosphere 2 | Atmosphere 3 | Atmosphere 4 |
| Example 1 | A | A | A | A |
| Example 2 | A | A | A | A |
| Example 3 | B | B | B | B |
| Example 4 | A | A | A | B |
| Example 6 | A | A | A | A |
| Example 7 | A | A | A | A |
| Comparative Example 3 | D | D | D | D |
| Comparative Example 4 | C | C | C | C |

A: maintenance not less than 1 month
B: maintenance for about 1 month
C: maintenance for several days
D: maintenance for several hours.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A polyimide resin raw material composition comprising
   (a) at least one tetracarboxylic compound selected from the group consisting of tetracarboxylic anhydride and tetracarboxylic diesters;
   (b) a diamine compound; and
   (c) at least one exo-3,6-epoxy-1,2,3,6-tetrahydrophthalic compound selected from the group consisting of exo-3,6-epoxy-1,2,3,6-tetrahydrophthalic anhydride and exo-3,6-epoxy-1,2,3,6-tetrahydrophthalic monoesters.

2. A polyimide resin raw material composition according to claim 1, wherein said diamine compound is diaminodiphenylmethane.

3. A prepolymer composition comprising the polymerization products of a polyimide resin raw material composition comprising of (i) at least one tetracarboxylic compound selected from the group consisting of tetracarboxylic anhydride and tetracarboxylic diesters; (ii) a diamine compound; and (iii) at least one exo-3,6-epoxy-1,2,3,6-tetrahydrophthalic compound selected from the group consisting of exo-3,6-epoxy-1,2,3,6-tetrahydrophthalic anhydride and exo-3,6-epoxy-1,2,3,6-tetrahydrophthalic monoesters.

4. A prepolymer composition comprising a prepolymer having the formula of

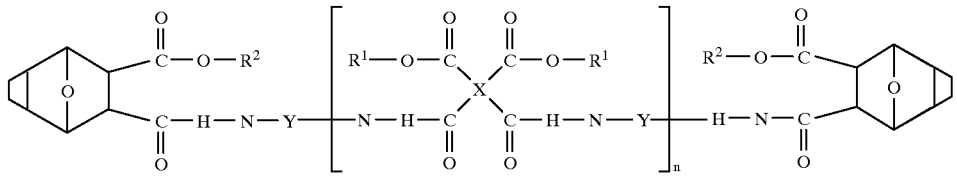

where in
X is a tetravalent organic group having 3 to 30 carbon atoms and having a carbocyclic structure, a heterocylic structure, or both;

R¹ is hydrogen or a monovalent organic group having 1 to 8 carbon atoms;

R² is hydrogen or a monovalent organic group having 1 to 8 carbon atoms;

Y is a divalent organic group having 1 to 30 carbon atoms; and n has a value in the range from 1 to 5.

5. A prepolymer composition of claim 4, wherein Y is a diphenylmethane group.

6. A prepolymer composition comprising a prepolymer having the formula of

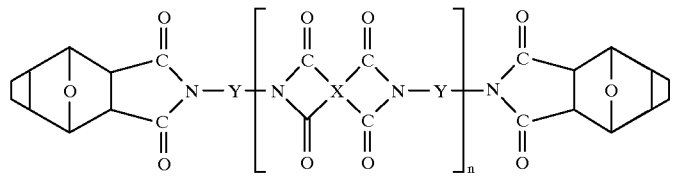

wherein
X is a tetravalent organic group having 3 to 30 carbon atoms and having a carbocyclic structure, a heterocylic structure, or both;

Y is a divalent organic group having 1 to 30 carbon atoms; and n has a value in the range from 1 to 5.

7. A prepolymer composition of claim 6, wherein Y is diphenylmethane group.

8. An object molded from a polyimide resin prepared from a polyimide prepolymer composition comprising a prepolymer having the formula of

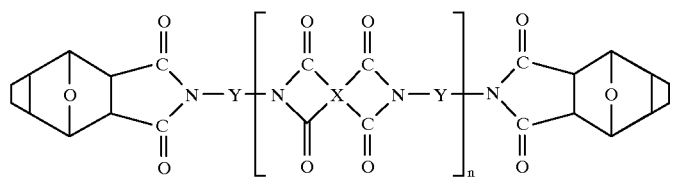

wherein
X is a tetravalent organic group having 3 to 30 carbon atoms and having a carbocyclic structure, a heterocylic structure, or both;

Y is a divalent organic group having 1 to 30 carbon atoms; and n has a value in the range from 1 to 5.

9. A molded object of claim 8, wherein Y is a diphenylmethane group.

10. A method for producing a prepreg for a fiber-reinforced polyimide composite material comprising impregnating a fiberous material comprising fibers with a solution selected from the group consisting of (a), (b), (c) and (d), wherein:

(a) is a solution prepared by dissolving in a solvent a polyimide resin raw material composition comprising (1) at least one tetracarboxylic compound selected from the group consisting of tetracarboxylic anhydride and tetracarboxylic diesters; (2) a diamine compound; and (3) at least one exo-3,6-epoxy-1,2,3,6-tetrahydrophthalic compound selected from the group consisting of exo-3,6-epoxy-1,2,3,6-tetrahydrophthalic anhydride and exo-3,6-epoxy-1,2,3,6-tetrahydrophthalic monoesters;

(b) is a solution of a polyamic acid prepolymer comprising amidation reaction products of the polyimide resin raw material composition solution;

(c) is a solution of a polyimide prepolymer comprising imidation reaction products of said polyamic acid prepolymer solution; and (d) is a mixture of at least two of (a), (b), and (c).

11. A method for producing a prepreg for a fiber-reinforced polyimide composite material according to claim 10, wherein said diamine compound is diaminodiphenylmethane.

12. A method for making a molded article composed of a polyimide resin, comprising:

preparing a polyimide material from one or more compositions selected from the group consisting of (a), (b), and (c), wherein (a) is a composition comprising (1) at least one tetracarboxylic compound selected from the group consisting of tetracarboxylic anhydride and tetracarboxylic diesters; (2) is a diamine compound; and (3) at least one exo-3,6-epoxy-1,2,3,6-tetrahydrophthalic compound selected from the group consisting of exo-3,6-epoxy-1,2,3,6-tetrahydrophthalic anhydride and exo-3,6-epoxy-1,2,3,6-tetrahydrophthalic monoesters;

(b) is a polyamic acid prepolymer composition comprising a prepolymer having the formula of

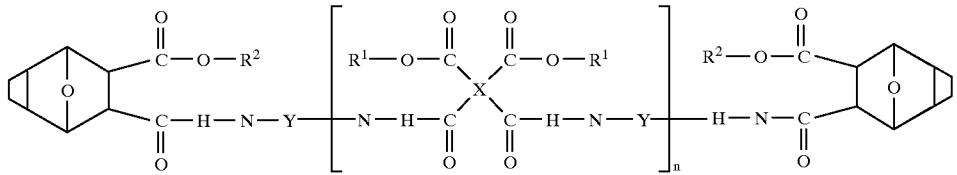

wherein

X is a tetravalent organic group having 3 to 30 carbon atoms and having a carbocyclic structure, a heterocylic structure, or both;

$R^1$ is hydrogen or a monovalent organic group having 1 to 8 carbon atoms;

$R^2$ is hydrogen or a monovalent organic group having 1 to 8 carbon atoms;

Y is a divalent organic group having 1 to 30 carbon atoms; and n has a value in the range from 1 to 5; and (c) is a polyimide prepolymer composition comprising a prepolymer having the formula of

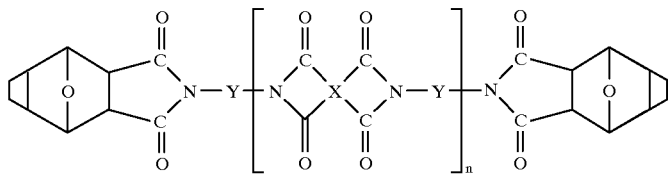

wherein

X is a tetravalent organic group having 3 to 30 carbon atoms having a carbocyclic structure, a heterocyclic structure, or both;

Y is a divalent organic group having 1 to 30 carbon atoms; and n has a value in the range from 1 to 5; conducting pre-curing molding with said polyimide material;
performing a pre-curing step;
performing a curing step; and
performing a post-curing operation.

13. A method for making a molded article composed of a polyimide resin according to claim 12, wherein said diamine compound is diaminodiphenylmethane.

14. A method for making a molded article composed of a polyimide resin according to claim 12, wherein said curing step is performed at a temperature range in which the maximum temperature is from about 200 to about 300° C.

15. A method for making a molded article composed of a polyimide resin according to claim 12, wherein said post-curing step is conducted at a temperature that is in the range of from about 260 to about 380° C. and is above the curing temperature.

16. A method for making a fiber-reinforced polyimide composite material, comprising:

preparing a prepreg by impregnating a fiberous material comprising reinforcing fibers with a solution selected from the group consisting of (a), (b), (c), and (d), wherein (a) is a solution prepared by dissolving in a solvent a polyimide resin raw material composition comprising (1) at least one tetracarboxylic compound selected from the group consisting of tetracarboxylic anhydride and tetracarboxylic diesters; (2) a diamine compound; and (3) at least one exo-3,6-epoxy-1,2,3,6-tetrahydrophthalic compound selected from the group consisting of exo-3,6-epoxy-1,2,3,6-tetrahydrophthalic anhydride and exo-3,6-epoxy-1,2,3,6-tetrahydrophthalic monoesters;

(b) is a solution of a polyamic acid prepolymer comprising amidation reaction products of the polyimide resin raw material composition solution;

(c) is a solution of a polyimide prepolymer comprising imidation reaction products of said polyamic acid prepolymer solution; and (d) is a mixture of at least two of the above; performing a pre-curing molding step on said prepreg;
performing a pre-curing step;
performing a curing step; and
performing a post-curing operation.

17. A method for making a fiber-reinforced polyimide composite material according to claim 16, wherein said curing step is performed at a temperature range in which the maximum temperature is from about 200 to about 300° C.

18. A method for making a fiber-reinforced polyimide composite material according to claim 16, wherein said pre-curing molding step is performed at a temperature of not higher than 200° C. under pressure.

19. A method for making a fiber-reinforced polyimide composite material according to claim 16, wherein said diamine compound is diaminodiphenylmethane.

20. A method for making a fiber-reinforced polyimide composite material according to claim 16, wherein said post-curing step is conducted at a temperature that is in the range of from about 260 to about 380° C. and is above the curing temperature.

21. A method for making a polyimide resin coating film, comprising of:

preparing a polyimide material from one or more compositions selected from the group consisting of (a), (b), and (c), wherein
(a) a composition comprising (1) at least one tetracarboxylic compound selected from the group consisting of tetracarboxylic anhydride and tetracarboxylic diesters; (2) a diamine compound; and (3) at least one exo-3,6-epoxy-1,2,3,6-tetrahydrophthalic compound selected from the group consisting of exo-3,6-epoxy-1,2,3,6-tetrahydrophthalic anhydride and exo-3,6-epoxy-1,2,3,6-tetrahydrophthalic monoesters;
(b) is a polyamic acid prepolymer composition comprising a prepolymer having the formula of

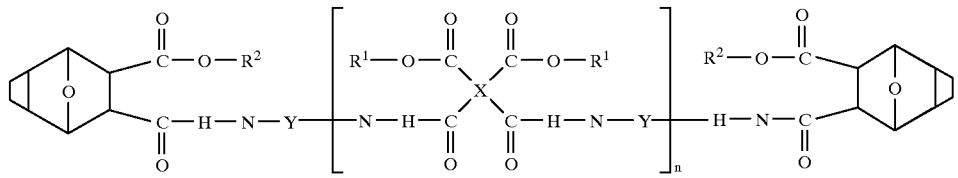

wherein
X is a tetravalent organic group having 3 to 30 carbon atoms and having a carbocyclic structure, a heterocylic structure, or both;
$R^1$ is hydrogen or a monovalent organic group having 1 to 8 carbon atoms;
$R^2$ is hydrogen or a monovalent organic group having 1 to 8 carbon atoms;
Y is a divalent organic group having 1 to 30 carbon atoms; and
n has a value in the range from 1 to 5; and
(c) is a polyimide prepolymer composition comprising a prepolymer having the formula of

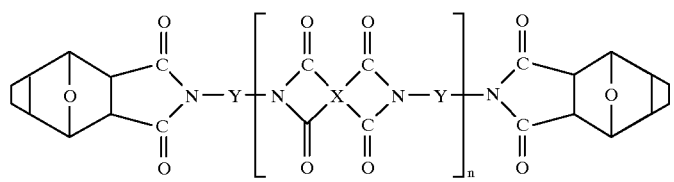

wherein
X is a tetravalent organic group having 3 to 30 carbon atoms and having a carbocyclic structure, a heterocylic structure, or both;
Y is a divalent organic group having 1 to 30 carbon atoms; and
n has a value in the range from 1 to 5; applying said polyimide material as a coating material on a substrate;

conducting a pre-curing molding step;

performing a pre-curing step;

performing a curing step; and performing a post-curing operation.

22. A method for making a polyimide resin coating film according to claim 21, wherein said diamine compound is diaminodiphenylmethane.

23. A method for making a polyimide resin coating film according to claim 21, wherein said curing step is performed at a temperature range in which the maximum temperature is from about 200 to about 350° C.

24. A method for producing a polyimide resin paint on a substrate comprising the steps of:

preparing a polyimide material from one or more compositions selected from the group consisting of (a), (b), and (c), wherein
(a) is a composition comprising (1) at least one tetracarboxylic compound selected from the group consisting of tetracarboxylic anhydride and tetracarboxylic diesters; (2) a diamine compound; and (3) at least one exo-3,6-epoxy-1,2,3,6-tetrahydrophthalic compound selected from the group consisting of exo-3,6-epoxy-1,2,3,6-tetrahydrophthalic anhydride and exo-3,6-epoxy-1,2,3,6-tetrahydrophthalic monoesters;
(b) is a polyamic acid prepolymer composition comprising a prepolymer having the formula of

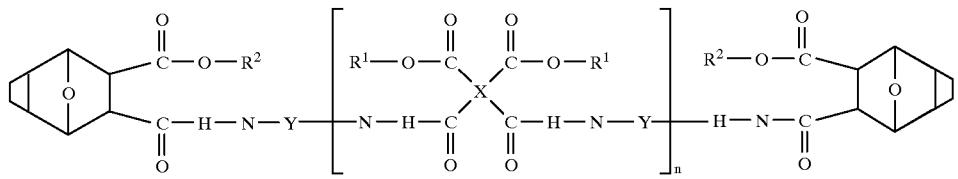

wherein
- X is a tetravalent organic group having 3 to 30 carbon atoms and having a carbocyclic structure, a heterocylic structure, or both;
- $R^1$ is hydrogen or a monovalent organic group having 1 to 8 carbon atoms;
- $R^2$ is a hydrogen or a monovalent organic group having 1 to 8 carbon atoms;
- Y is a divalent organic group having 1 to 30 carbon atoms; and
- n has a value in the range from 1 to 5; and (c) is a polyimide prepolymer composition comprising a prepolymer having the formula of

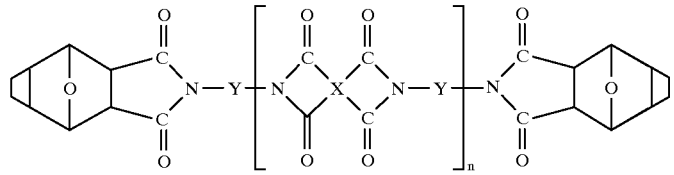

wherein
- X is a tetravalent organic group having 3 to 30 carbon atoms and having carbocyclic structure, heterocylic structure, or both;
- Y is a divalent organic group having 1 to 30 carbon atoms; and
- n has a value of in the range from 1 to 5;

mixing a pigment with said polyimide material to form a mixture;

applying said mixture to the substrate;

performing a pre-curing molding step;

conducting a pre-curing step;

performing a curing step; and performing a post-curing operation.

25. The method for producing a polyimide resin paint on according to claim 24, wherein said diamine compound is diaminodiphenylmethane.

26. A method fog producing a polyimide resin paint according to claim 24, wherein said curing step is performed at a temperature range in which the maximum temperature is from about 200 to about 350° C.

* * * * *